(12) United States Patent
Kawakami et al.

(10) Patent No.: US 7,116,844 B2
(45) Date of Patent: Oct. 3, 2006

(54) METHOD FOR GENERATING VECTOR DATA FOR A HAND-DRAWN CURVE

(75) Inventors: Yosuke Kawakami, Tokyo (JP); Hiroshi Ono, Tokyo (JP)

(73) Assignee: Celsys Co., Ltd., (JP)

( * ) Notice: Subject to any disclaimer, the term of this patent is extended or adjusted under 35 U.S.C. 154(b) by 793 days.

(21) Appl. No.: 10/215,642

(22) Filed: Aug. 9, 2002

(65) Prior Publication Data

US 2004/0028274 A1    Feb. 12, 2004

(51) Int. Cl.
*G06K 7/00*    (2006.01)
(52) U.S. Cl. .................................. 382/314; 178/19.04
(58) Field of Classification Search ................ 382/119, 382/120; 178/19.04
See application file for complete search history.

(56) References Cited

U.S. PATENT DOCUMENTS 5,054,088 A * 10/1991 Gunderson et al. ......... 382/120
5,347,589 A *  9/1994 Meeks et al. ............... 382/119

FOREIGN PATENT DOCUMENTS

| JP | 10069345 | * | 3/1998 |
| JP | 11224080 | * | 8/1999 |
| JP | 2002-196878 A1 | | 7/2002 |

OTHER PUBLICATIONS

USPTO official translation of JP Kokai Patent Application No. HEI 11[1999]-224080.*
USPTO official translation of JP Kokai Patent Application No. HEI 10[1998]-69345.*

* cited by examiner

*Primary Examiner*—Brian Werner
(74) *Attorney, Agent, or Firm*—Lerner, David, Littenberg, Krumholz & Mentlik, LLP

(57) ABSTRACT

The present invention relates to obtaining vector data for a hand-drawn curve having coordinate values input from a pointing device and a thickness and/or density in accordance with pen pressure values. In order to reduce the amount of data input from the pointing device and obtain vector data therefor in real time, the coordinate data and pen pressure data are extracted independently of each other so as to reduce the amount of data stored in a memory and used for plotting or display.

13 Claims, 19 Drawing Sheets

FIRST POINT

ALTHOUGH NO OTHER POINTS FOR EVALUATION EXIST, THIS IS TREATED AS THE STARTING POINT AND EXTRACTED AS A CHATACTERISTIC POINT

SECOND POINT

BECAUSE IT FALLS WITHIN THE PRECISION CIRCLE, THIS IS NOT A CHARACTERISTIC POINT

THIRD POINT

TANGENT A

TANGENT B

FOURTH POINT

TANGENT A

TANGENT B

FIFTH POINT

F I G. 4
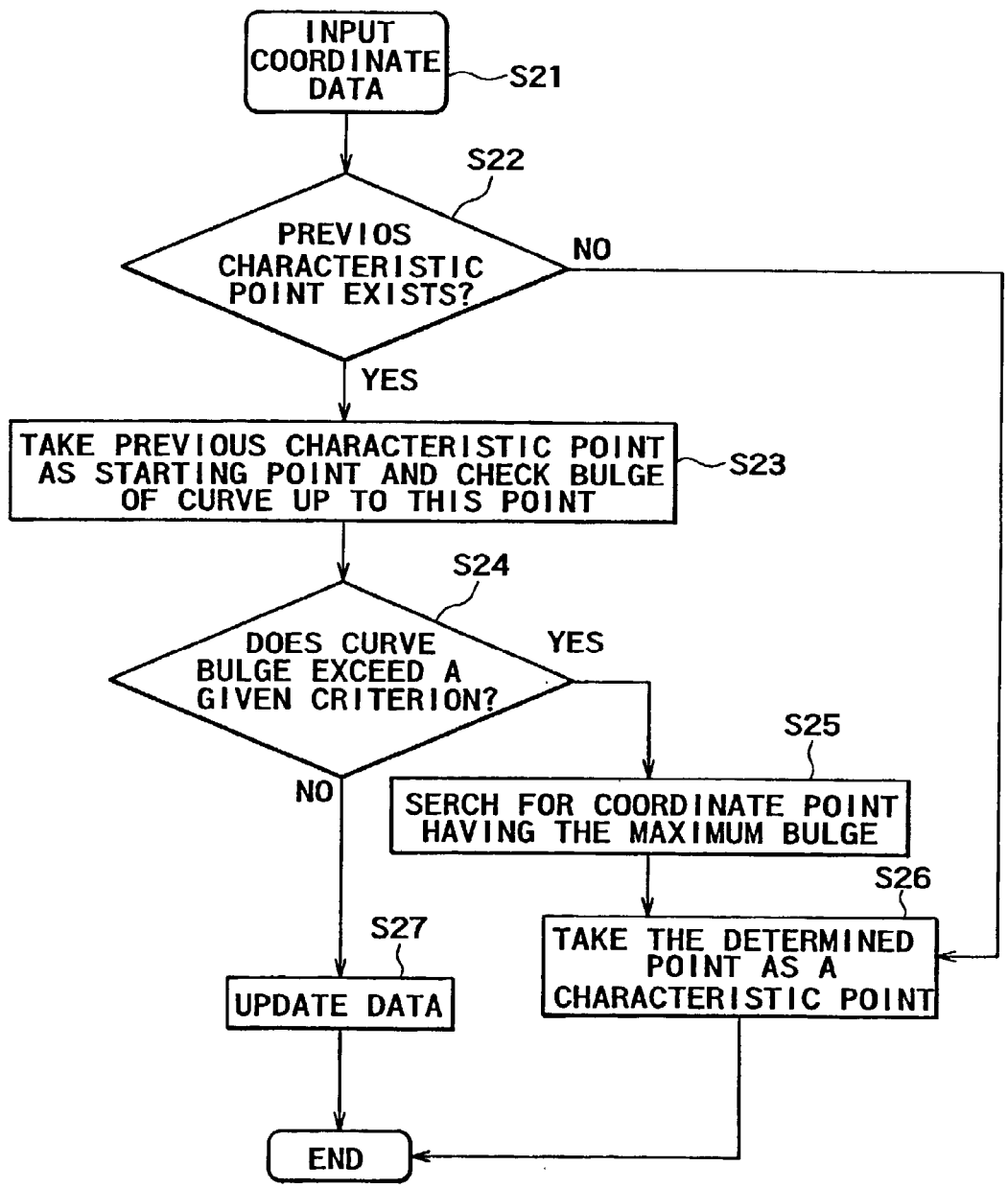

DATA POINTS=25

DATA POINTS=15

DATA POINTS=6

F I G. 17A
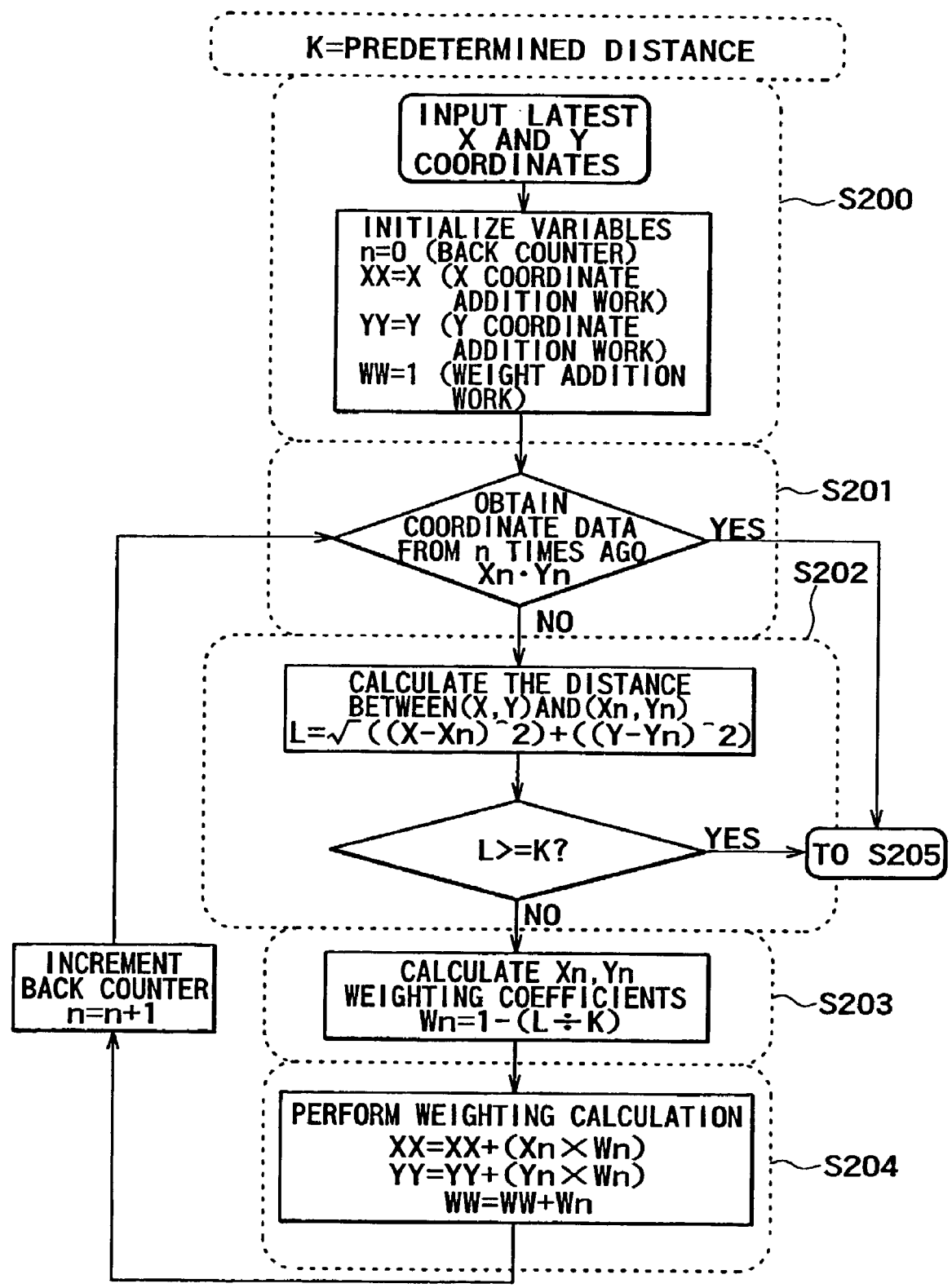

METHOD FOR GENERATING VECTOR DATA FOR A HAND-DRAWN CURVE

BACKGROUND OF THE INVENTION

1. Field of the Invention

The present invention relates to a method for obtaining vector data for a line having coordinate values input from a pointing device and a thickness and/or density in accordance with pen pressure values, a computer program for executing the method, and an associated image processing apparatus.

2. Description of Related Art

Known image processing apparatuses and image processing software have displayed a line having a thickness and/or density responsive to pen pressure when a user inputs a line via a pointing device, such as the combination of a pen and tablet or digitizer.

With this type of image processing apparatuses in the past (whether they were dedicated image processing apparatuses or general-purpose computers running image processing software), because the data sent from the pointing device is coordinate value data and pen pressure data for each pixel, a large amount of data is involved. For this reason, some method is used to compress the data used for plotting and image-processing the input data. The method generally used of reducing the amount of data is that of determining the arithmetic mean of a prescribed number of continuous data.

When applying this arithmetic mean processing, a part of a line that exhibits a sudden curve is smoothed out too much by taking the arithmetic mean, imparting rounding thereto, thereby presenting the problem of not being able to plot the line as input by an operator. In the same manner, a sudden change in pen pressure is also smoothed by the arithmetic mean, so that the change in pen pressure cannot faithfully reproduced.

Although high-resolution apparatuses (with a large number of display pixels) are available for the purpose of faithfully following an input curve and the pen pressure from a pointing device, if the input data is stored as is in this case a large amount of memory capacity is required to store the input data. An additional problem is that of a large amount of time being required to process the large amount of data used for creating and editing illustrations and the like.

Hand-drawn strokes are subject to effects of a shaky hand or unsteady hand, so that they are not smooth, and considerable experience is required in order to eliminate shakiness, making it quite difficult to achieve the curve intended by the user. There is known software for smoothing hand-drawn strokes, but such smoothing processing does not start, or the results of the processing could not be displayed until a stroke (path) of a hand-held pen comes to an end, thereby presenting the problem for the user of a delay in the verification of the results.

SUMMARY OF THE INVENTION

Accordingly, it is an object of the present invention to provide a method which reduces the amount of coordinate data and pen pressure data input from a pointing device, while producing a simultaneously smoothed display that is as faithful as possible to a hand-drawn stroke indicated by continuously input coordinate data, and a computer program and image processing apparatus for executing the method.

One aspect of the present invention is a method for obtaining vector data for a hand-drawn curve, this method including a step of receiving and storing in a temporary memory pen pressure data regarding a hand-drawn path obtained from a pointing device, a first extraction step of extracting from the coordinate data stored in the temporary memory characteristic coordinate points indicating characteristics of the path using an arithmetic processor, a coordinate data storage step of storing the obtained characteristic point data into a first storage means, a second extraction step of extracting pen pressure characteristic points characterizing changes in pen pressure from the pen pressure data stored in the temporary memory using the arithmetic processor, a pen pressure data storage step of storing the obtained pen pressure characteristic points into a second storage means, and a plotting processing step of using the coordinate characteristic points stored in the first storage means and the pen pressure characteristics points stored in the second storage means to calculate a curve along which the thickness or density thereof changes in response to the pen pressure using the arithmetic processor. The two extraction steps can be carried out independently of each other. The method according to this aspect of the present invention can extract characteristic points in real time while a curve is drawn by hand, thereby making it possible to eliminate or reducing jitters along an intended curve caused by shakiness or unsteadiness of a hand or by electromagnetic errors, while simultaneously obtaining vector data for the hand-drawn curve.

In another aspect of the present invention, before the first and second extraction steps, a pre-processing step for reducing jitters of coordinate data and pen pressure data stored in the temporary memory.

The data of the pen pressure characteristic points can include the pen pressure data of an extracted characteristic point and the distance from the previous characteristic point to that pen pressure characteristic point, and the coordinate data can include the coordinates of an extracted characteristic point and the distance from the previous characteristic point to that coordinate characteristic point. Such data obtained after the extraction is often called vector data.

It is further possible in the present invention to perform a third extraction step of obtaining further coordinate characteristic points by performing an additional characteristic point extraction with respect to the coordinate characteristic points obtained by the first extraction step, this being performed before the coordinate data storage step. In the same manner it is possible to perform a fourth extraction step of obtaining a further pen pressure characteristic points by performing additional characteristic point extraction with respect to the pen pressure data characteristic points obtained by the second extraction step, this being performed before the pen pressure data storage step.

In the plotting processing step, it is possible to interpolate coordinate characteristic point data using a spline curve, the results therefrom being taken an output curve to be plotted or displayed on a screen. In the same manner, it is possible to perform pen pressure characteristic point data interpolation using a spline curve, thereby obtaining curve thickness or density for plotting or display on a screen. By doing this, it is possible to obtain a beautiful smooth curve from manual input.

Additionally, the temporary memory may be configured as a ring in the present invention, so that when the temporary memory becomes full, the oldest data therein is overwritten by the recently input data. This way of storing data used in the real time processing can greatly reduce the amount of memory capacity required.

The method of present invention can be further embodied as a program running on a general-purpose computer, or as an image-processing apparatus.

BRIEF DESCRIPTIONS OF THE DRAWINGS

FIG. 4 is a flowchart showing processing for extraction of coordinate characteristic points.

Figure 11A:
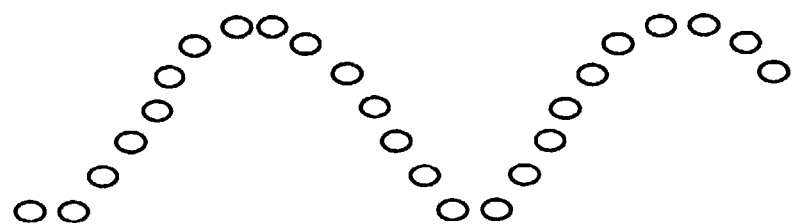
Figure 11B:
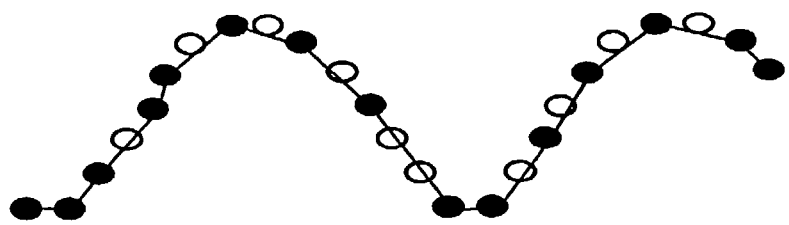
Figure 11C:
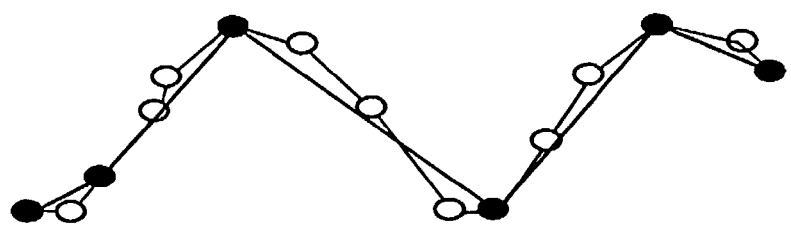

FIG. 11(A) through FIG. 11(C) are drawings illustrating the results of extraction processing.

Figure 12:
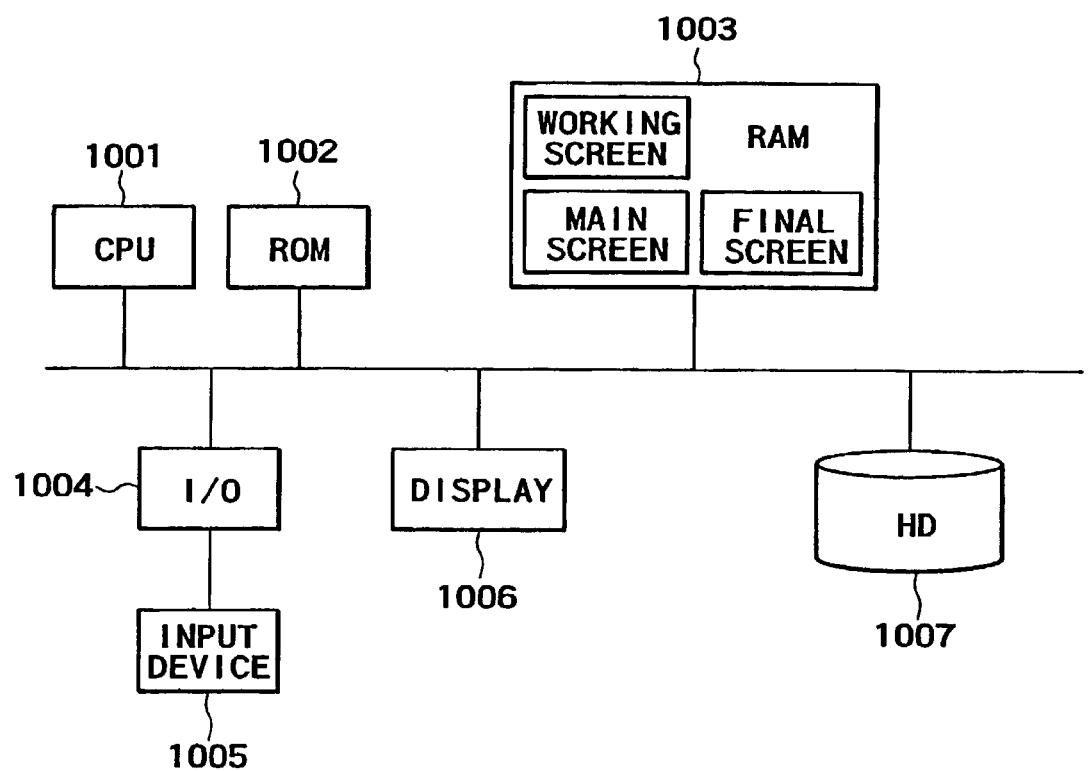

FIG. 12 is a block diagram showing the system configuration of an image processing apparatus.

Figure 13:
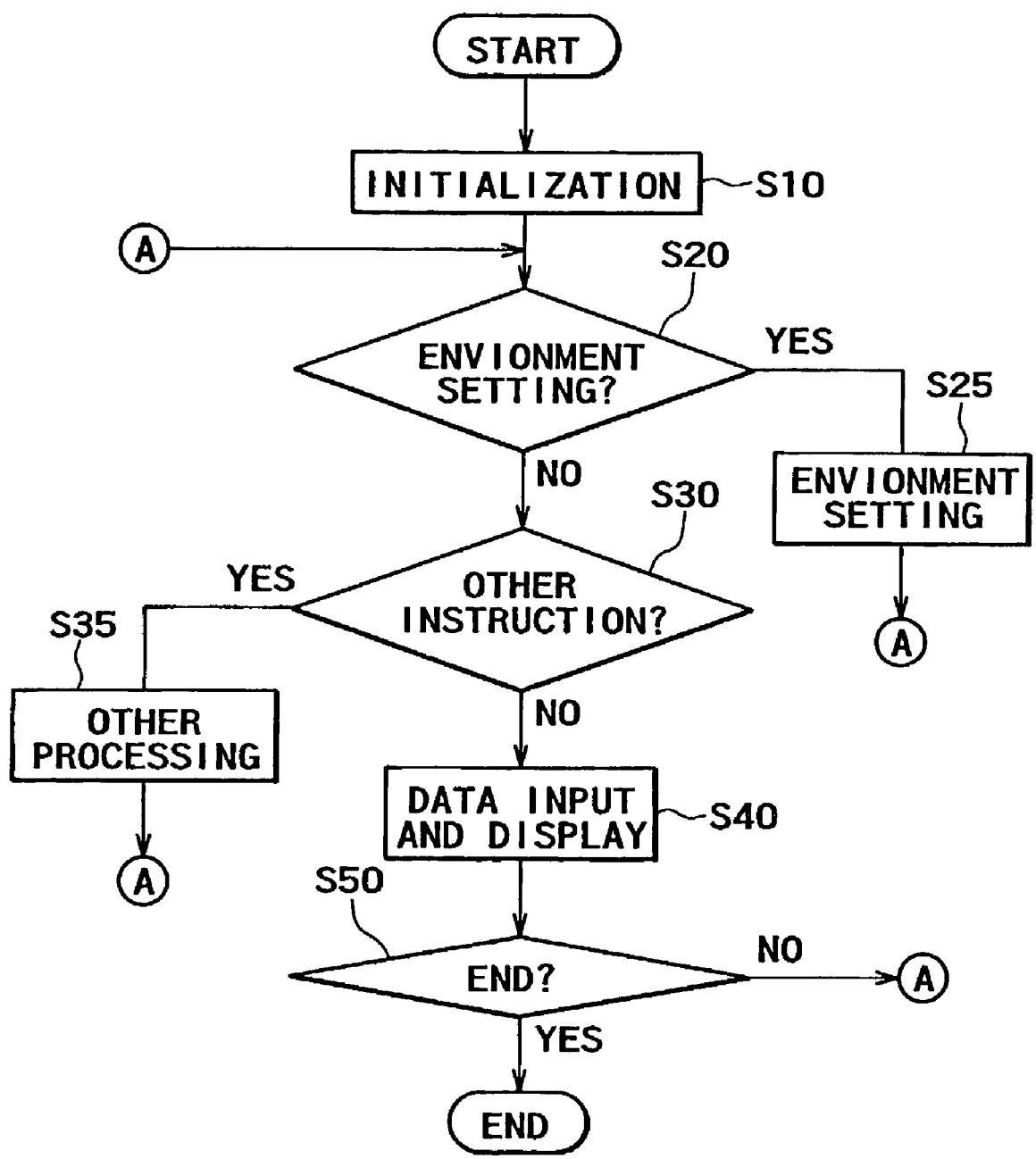

FIG. 13 is a flowchart showing the main processing procedure.

Figure 14:
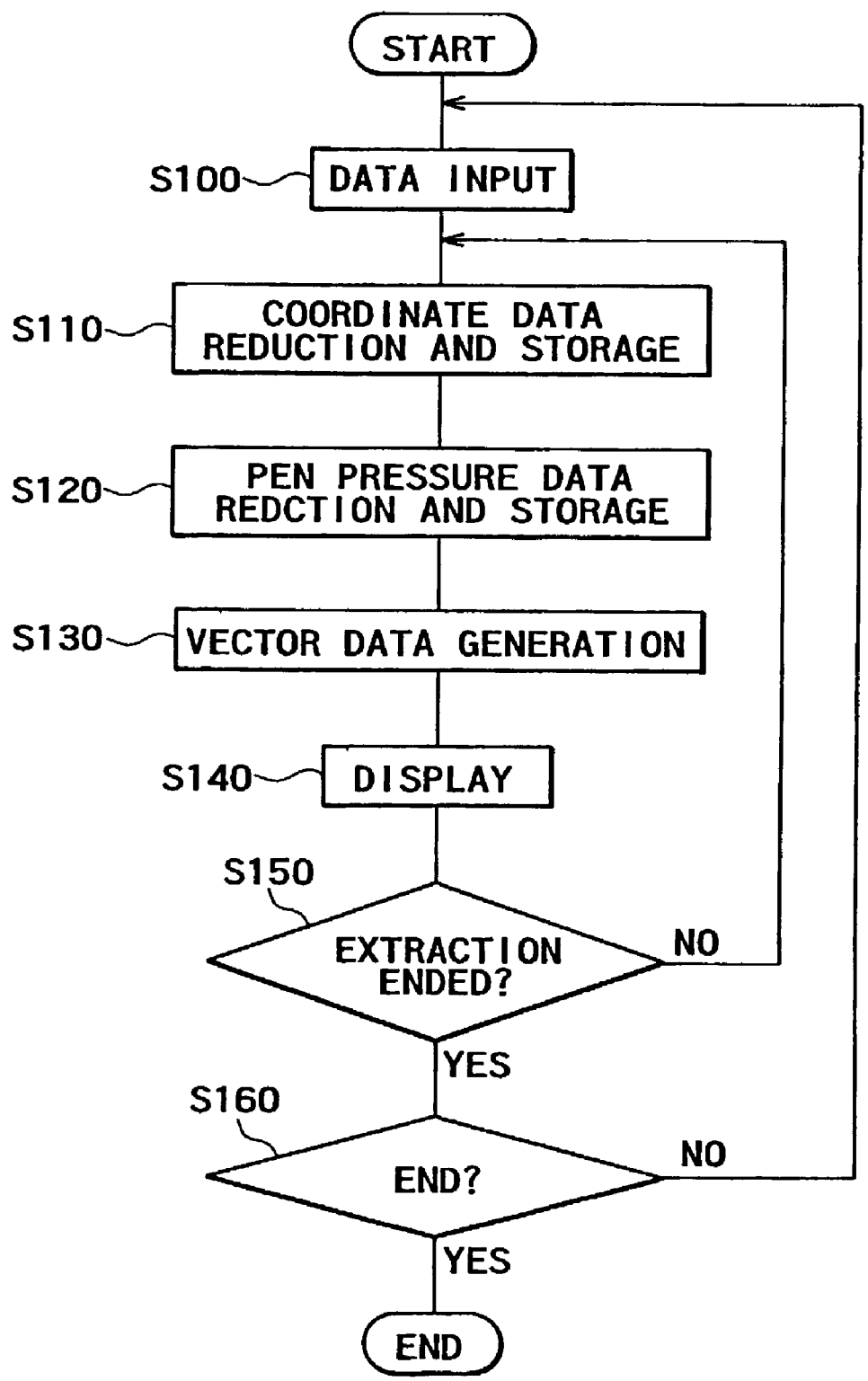

FIG. 14 is a flowchart showing the data extraction processing procedure.

Figure 15:
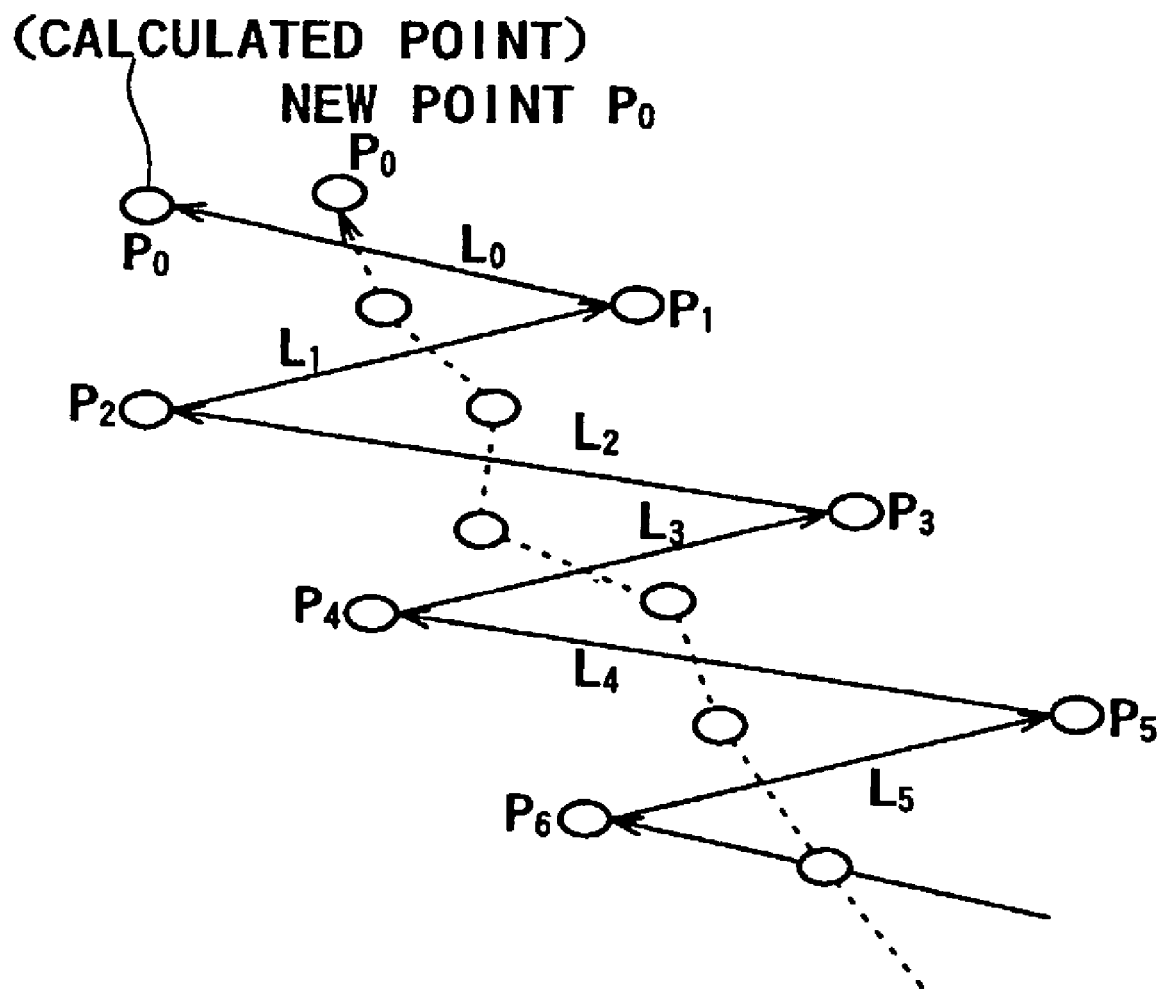

FIG. 15 is a drawing illustrating details of jitter processing.

Figure 16:
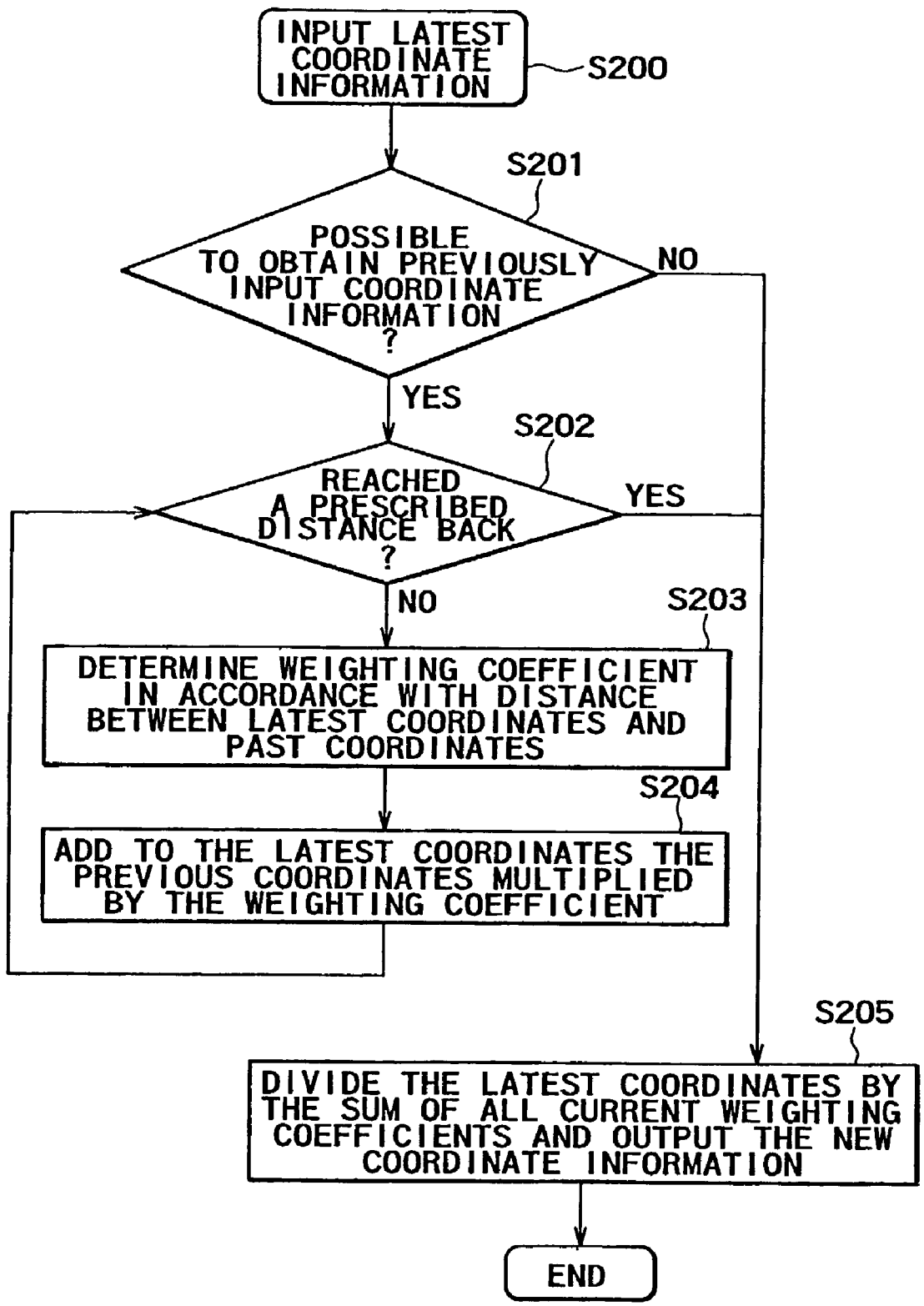
Figure 17B:
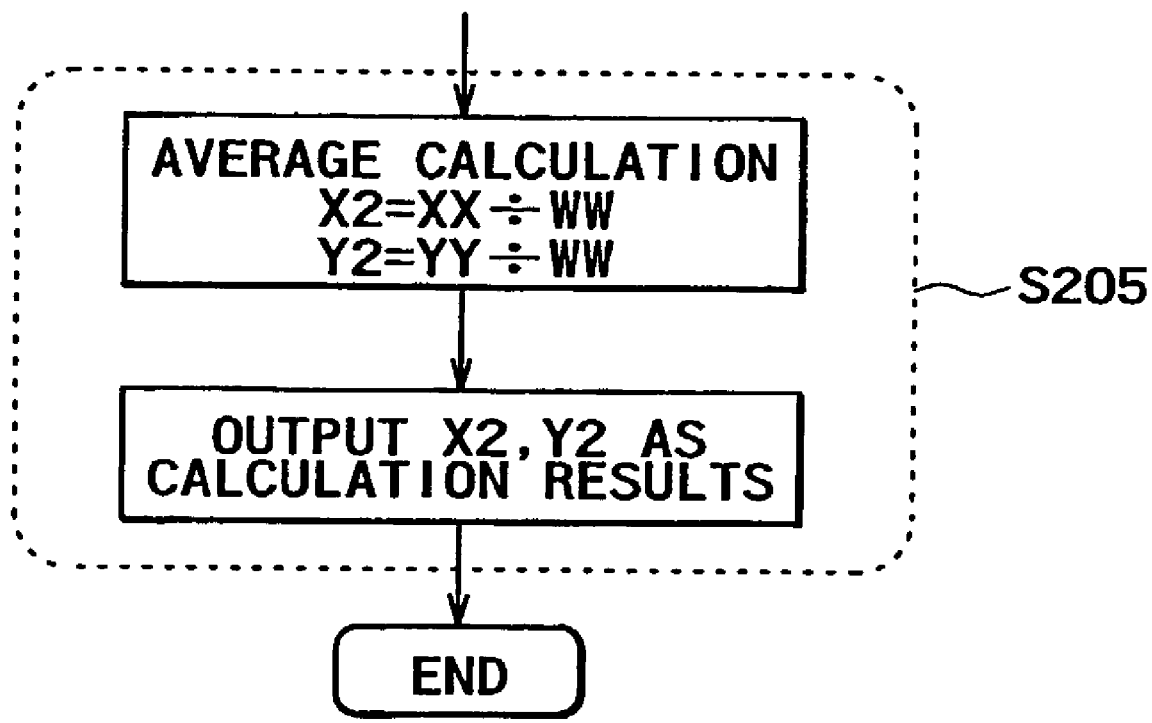

FIG. 16 and FIG. 17 are flowcharts showing jitter processing.

DETAILED DESCRIPTION OF THE PREFERRED EMBODIMENTS

Embodiments of the present invention are described in detail below, with reference made to relevant accompanying drawings.

Figure 1:
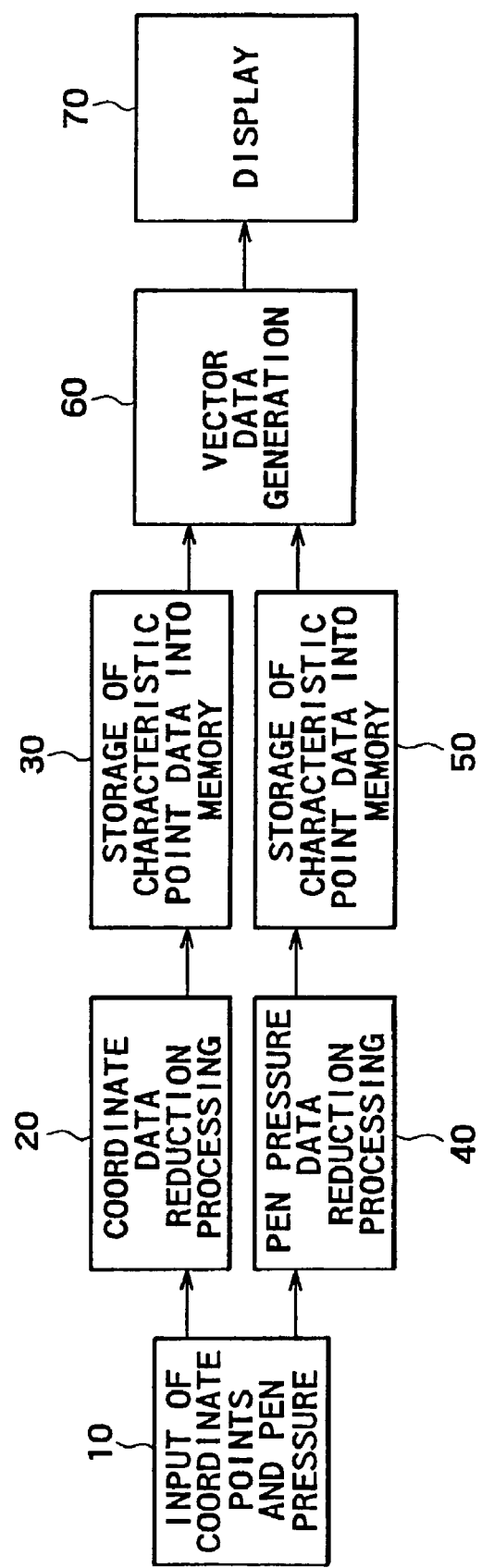
FIG. 1 is a block diagram illustrating an image processing method according to an embodiment of the present invention.

FIG. 1 shows the image processing method to which the present invention is applied.

The procedure shown in FIG. 1 is implemented by a program run within an image-processing apparatus or on a computer. At step 10 in FIG. 1, coordinate data and pen pressure data from a pointing device are continuously input. At step 20, the amount of continuously input coordinate data is reduced. In this embodiment, in order to reduce the amount of data, characteristic data (characteristic point data) is extracted from the input data and the extracted characteristic point data is used for plotting. The method of extracting characteristic points is as follows.

In this case, the extraction of the characteristic points is done before the end of stroke in which the pen is traveling, that is, extraction is started while the pen is still moving on the tablet, and as data continues to be input. That is, input data is stored in, for example, a ring-configured memory, from which it is sequentially taken as characteristic points are extracted, the extracted characteristic points being stored in a separate memory. The ring-configured memory successively stores data in time sequence, and when the memory becomes filled, the oldest data is replaced by the newest data. The above-noted characteristic point extraction is completed during the time the data exists in the ring-configured memory. Only data of the extracted characteristic points are stored in the separate memory. By doing this, it is possible to reduce the extremely large amount of input data, thereby reducing the required memory capacity. The size of the ring-configured memory is made such that it is possible to store data longer then the time required for calculation of the input data, based on the frequency of the characteristic point extraction and time required for characteristic point extraction. If the size of the ring-configured memory is insufficient, during the calculation of characteristic points old data will be overwritten by the newest data, making calculation impossible.

At step 30, the coordinate data for extracted characteristic points is stored in memory. At step 40, the amount of data is reduced by extracting data of characteristic points from the pen pressure data that is continuously input. At step 50, the extracted characteristic point pen pressure data is stored in memory.

In the above case, it should be noted that because the extraction of characteristic points from the pen pressure data and the extraction of characteristic points from the coordinate data are performed independently, is it not necessary that there be correspondence between the coordinates of pen pressure data characteristic points and the coordinates of coordinate data characteristic points. For this reason, pen pressure values at characteristic points of the coordinate data are obtained by performing interpolation processing of the characteristic points of pen pressure data. The coordinates of characteristic points and pen pressure values thereat obtained by this processing will be called vector data.

At step 60, this vector data is generated. At step 70, lines connecting a plurality of generated vector data are displayed with a line width and/or density corresponding to the pen pressure. In this embodiment, data at a prescribed number of points of the continuously input coordinate data and pen pressure data are used in repeating the above-noted steps. Therefore, the path input by an operator via the pointing device (continuous coordinate data) and the associated pen pressure are plotted in real time on a display screen. That is, before the stroke at which the pen is currently located is completed, the pen movement is sequentially tracked and displayed on the screen. In this embodiment, because the characteristic points of the path input by the operator and characteristic points of associated pen pressure are extracted, the path and the line width reproduced on the display screen successively reproduce these characteristics. Thus, even if the pen stroke exhibits minute jaggedness due to the shaking of the hand, or if the data includes errors, it is possible to remove this jaggedness or error. Therefore a somewhat smoothed path, with appropriate line with or density is plotted on the screen, simultaneously with which the results are stored in memory.

The characteristic extraction method of this embodiment is described below with reference to FIG. 2 through FIG. 8.

Figure 2:
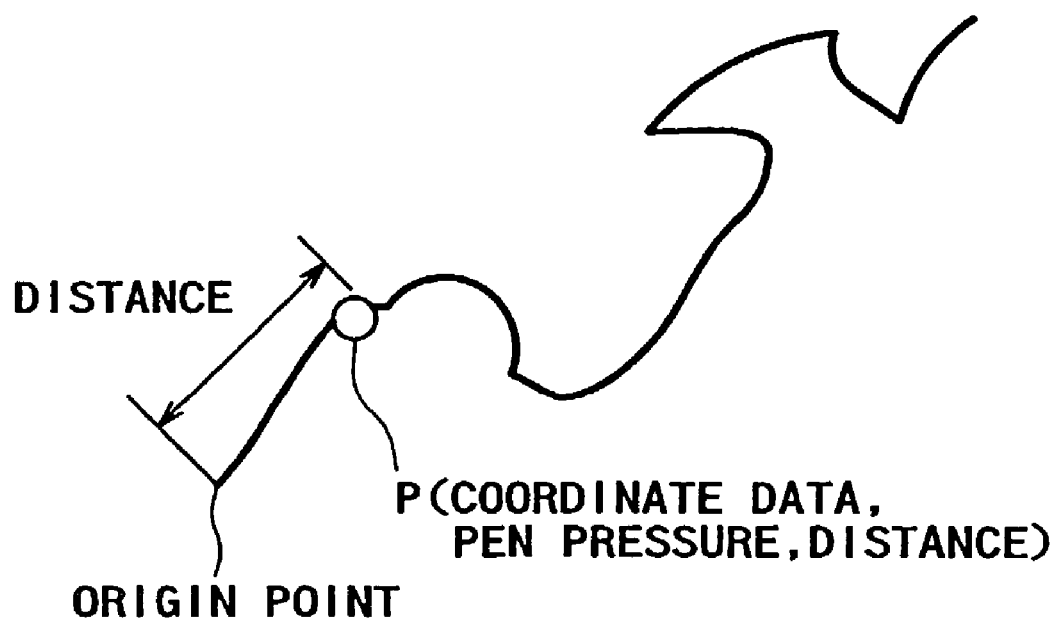
FIG. 2 is a drawing illustrating the image-processing method of an embodiment of the present invention.

When the operator uses a pointing device to describe a path such as shown in FIG. 2, the pointing device successively generates coordinate data and pen pressure data along the path, these being input to an image-processing apparatus. At the image-processing apparatus, the path length is calculated from the starting point of the input coordinate data and pen pressure data, and the results of this calculation is temporarily stored in memory as a single data that combines the coordinate data and the pen pressure data. In this process, in order to limit the size of the memory, it is desired that the above-noted data set is stored in a ring-configured memory in a circular fashion, meaning that when data for a prescribed number of points has been stored, the next data overwrites the leading (oldest) data that had been stored up until this point.

A characteristic point is extracted from coordinate data of a data set of a prescribed number of points temporarily stored in memory, for example from a data set corresponding to 10 points. The method of performing this extraction is shown in FIG. 3. First, because the first (starting) point is treated as the origin point, this is taken as a characteristic point. Assuming a virtual circle centered on the $1^{st}$ point (1), if there is a point indicated by $2^{nd}$ and subsequent coordinate data exists within the virtual circle, such as shown at (B), $2^{nd}$ and subsequent coordinate data are eliminated (not extracted).

Figure 3A:
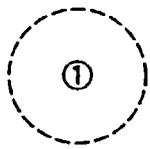
FIG. 3 is a drawing illustrating processing for extraction of coordinate characteristic points.
Figure 3B:
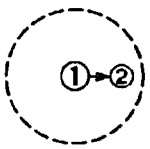
Figure 3C:
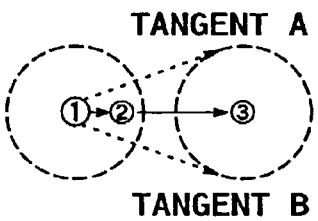

If a point exists outside the virtual circle, such as the $3^{rd}$ point shown in FIG. 3, when this point is encountered a virtual circle is assumed to exist centered on that point, as shown in FIG. 3(C).

Next, a judgment is made as to whether or not the coordinates of the next point, in this case the $4^{th}$ point, are within the angle between the two tangent lines A and B (refer to FIG. 3(C)) to the $3^{rd}$ point virtual circle from the previous characteristic point ($1^{st}$ point in this case). If the $4^{th}$ point is within this angle, the coordinate data of the $3^{rd}$ point is not extracted. If the $4^{th}$ point is outside this range, however, the coordinate data of the $3^{rd}$ point is extracted as coordinate data of a characteristic point, which is stored together with the distance from the $1^{st}$ point, which was the origin point.

Figure 3D:
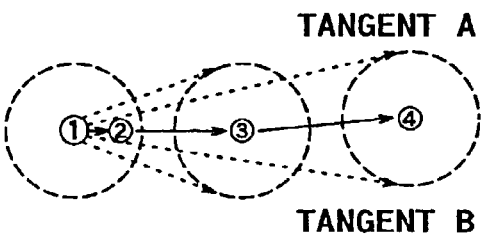

If the $4^{th}$ point does not exist within the above-noted angle range, a virtual circle is assumed, centered on the $4^{th}$ point, and two tangent lines are established extending from the $1^{st}$ point and tangential to the virtual circle of the $4^{th}$ point (refer to FIG. 3(D)). A judgment is then made as to whether or not the next ($5^{th}$) point exists within the angle formed by these two tangent lines.

Figure 3E:
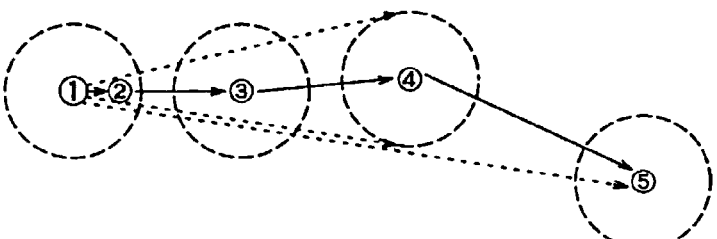

As shown in FIG. 3(E), in this example because the data of the $5^{th}$ point exists within the above-noted angle range, the coordinates of the $4^{th}$ point are stored (extracted) in a separate area of memory as coordinate data of a characteristic point. After that is done, the extracted characteristic point becomes the origin point and the above-noted processing is successively applied to newly input coordinate data so as to extract characteristic points therefrom.

The above-noted processing is simply the finding of a characteristic point on a path in which two characteristic points are separated by at certain distance (radius of the virtual circle) and in which the degree of curvature (otherwise described simply as curvature) of the path joining to two characteristic points exceeds a prescribed value.

The flow in the process of extracting a characteristic point in the above-noted method is shown a flowchart in FIG. 4. At step 21 the coordinate data of point are received. If there is no previous characteristic point, this point is taken as a new characteristic point (steps 22 and 26). If there had been a previous characteristic point, the bulge of the curve to the current point from that point as the origin is checked (step 23). If the bulge exceeds a certain criterion, the point between that point and the origin point having the greatest bulge is determined (step 25). One criterion, as described with reference to FIG. 3, is whether the line segment from the origin point to a new point is outside the boundaries formed by lines extending from the origin point and tangent to a circle about the previous point, in which case the criterion has been exceeded. It is alternatively possible to use a different criterion as a threshold to express the bulging.

The determined point is then taken as a characteristic point (step 26). If the bulge is within the criterion, after updating data for extraction of the characteristic point (step 27), a wait is made for the next coordinate point and the above steps are repeated.

The method of extracting the pen pressure data characteristic points is described below with reference to FIG. 5 through FIG. 8.

Figure 5:
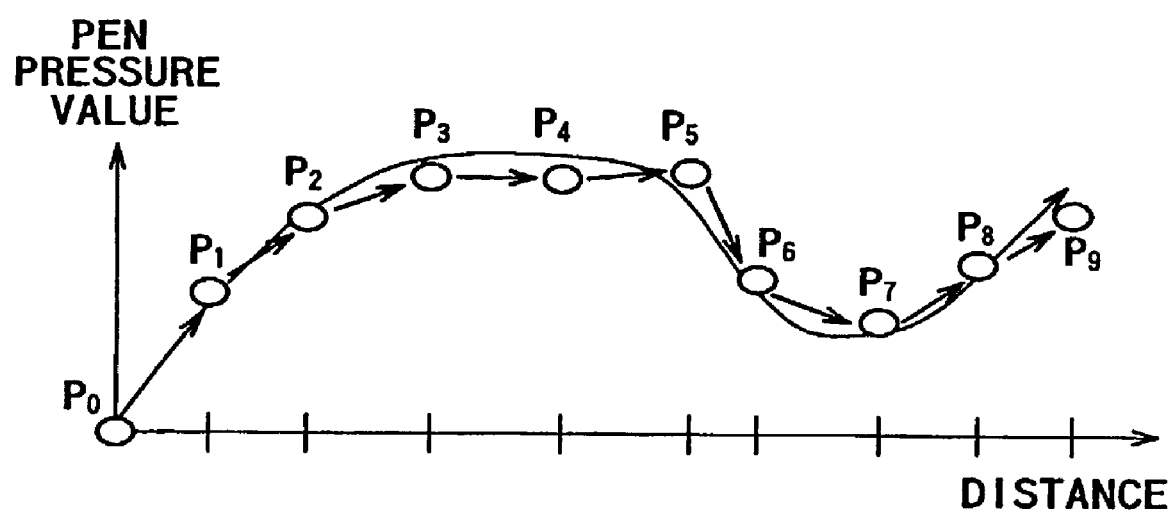
FIG. 5 and FIG. 6 are drawings illustrating processing for extraction of pen pressure characteristic points.
Figure 6A:
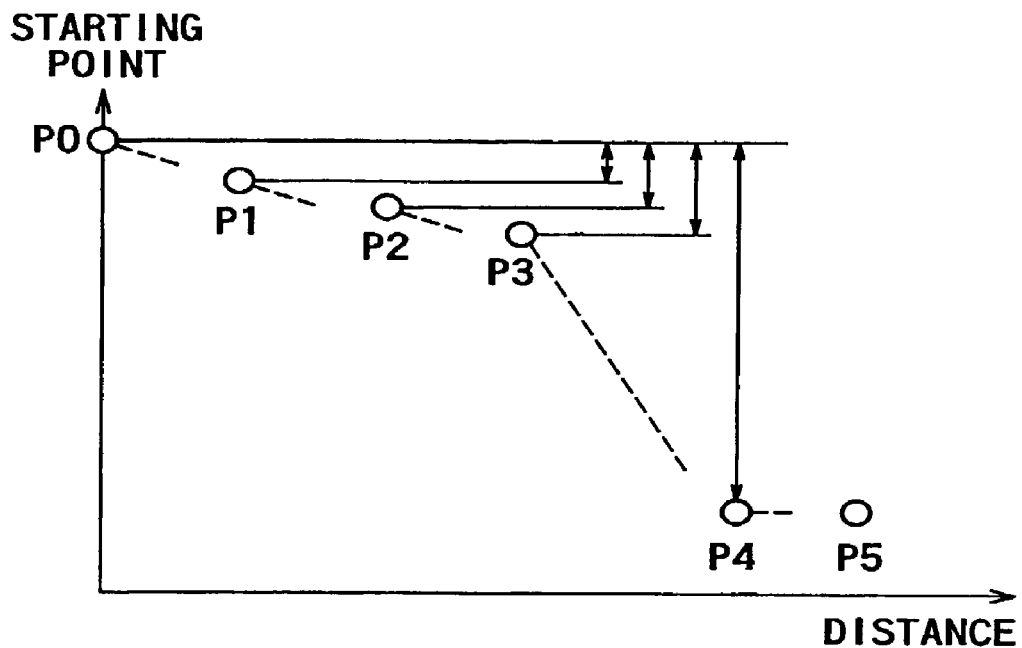
Figure 6B:
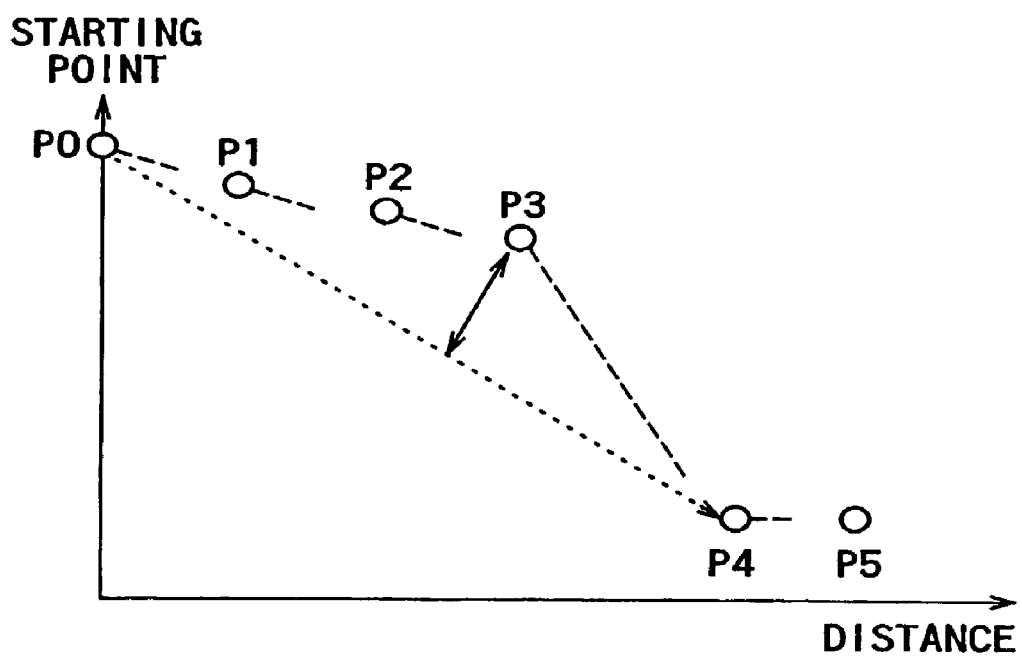

Pen pressure data is expressed by plotting a path such as shown in FIG. 5, with distance on the path to the origin point or from characteristic point previously discovered along the horizontal axis and the pen pressure along the vertical axis. As shown in FIG. 6(A), the change values of pen pressure at each of the points $P_1$, $P_2$, $P_3$, and so on after a starting point ($P_0$ in this case) are determined. If a change value is less than a certain threshold value, they are at first ignored, and a change value exceeding this threshold value is taken as a characteristic point. In FIG. 6(A), $P_4$ is such a characteristic point. After this, a line segment between the starting point ($P_0$) and the characteristic point ($P_4$) and the distances between the ignored points $P_1$, $P_2$, and $P_3$ between the starting point and the characteristic point are determined, and the point having the greatest distance ($P_3$ in this case) is found, this being inserted between the starting point and the characteristic point. The insertion of this intermediate point is done to add appropriate information regarding to which side a curve curves when it connects a starting point and a characteristic point. The extracted characteristic point is then taken as a new starting point, and the above-noted steps are performed so said to extract the next characteristic point.

Figure 7:
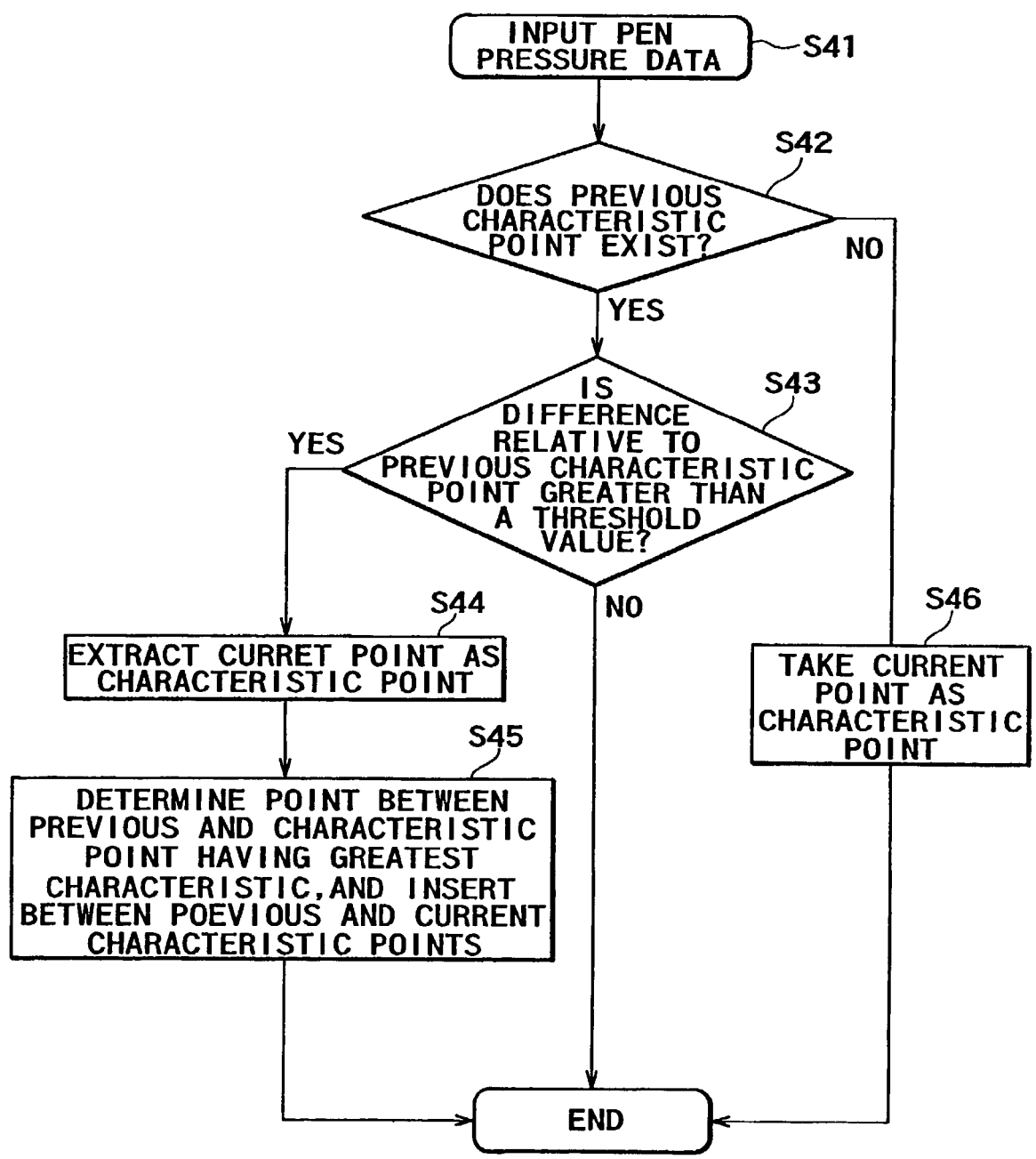
FIG. 7 and FIG. 8 are flowcharts showing processing for pen pressure data characteristic point extraction.
Figure 8A:
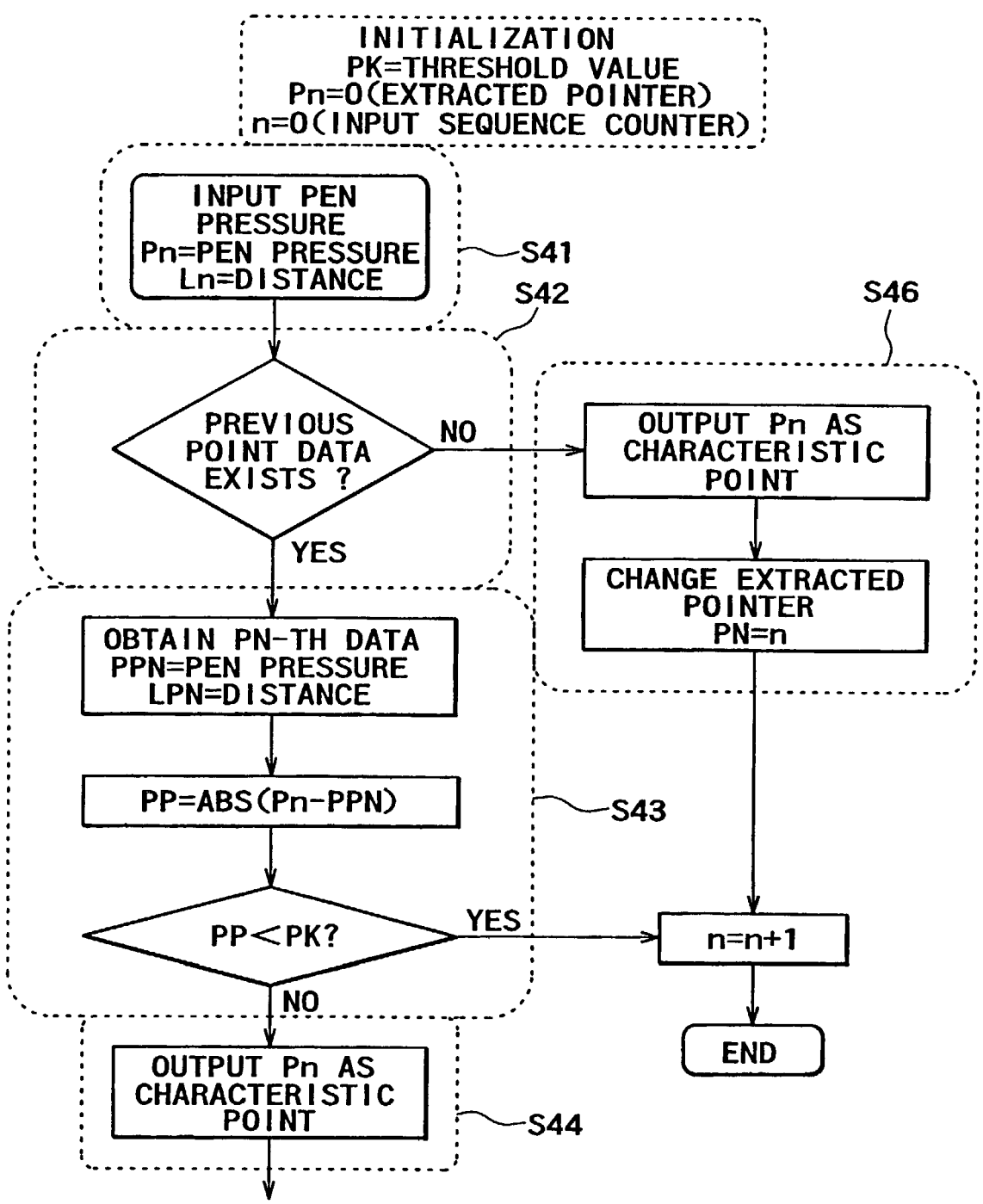
Figure 8B:
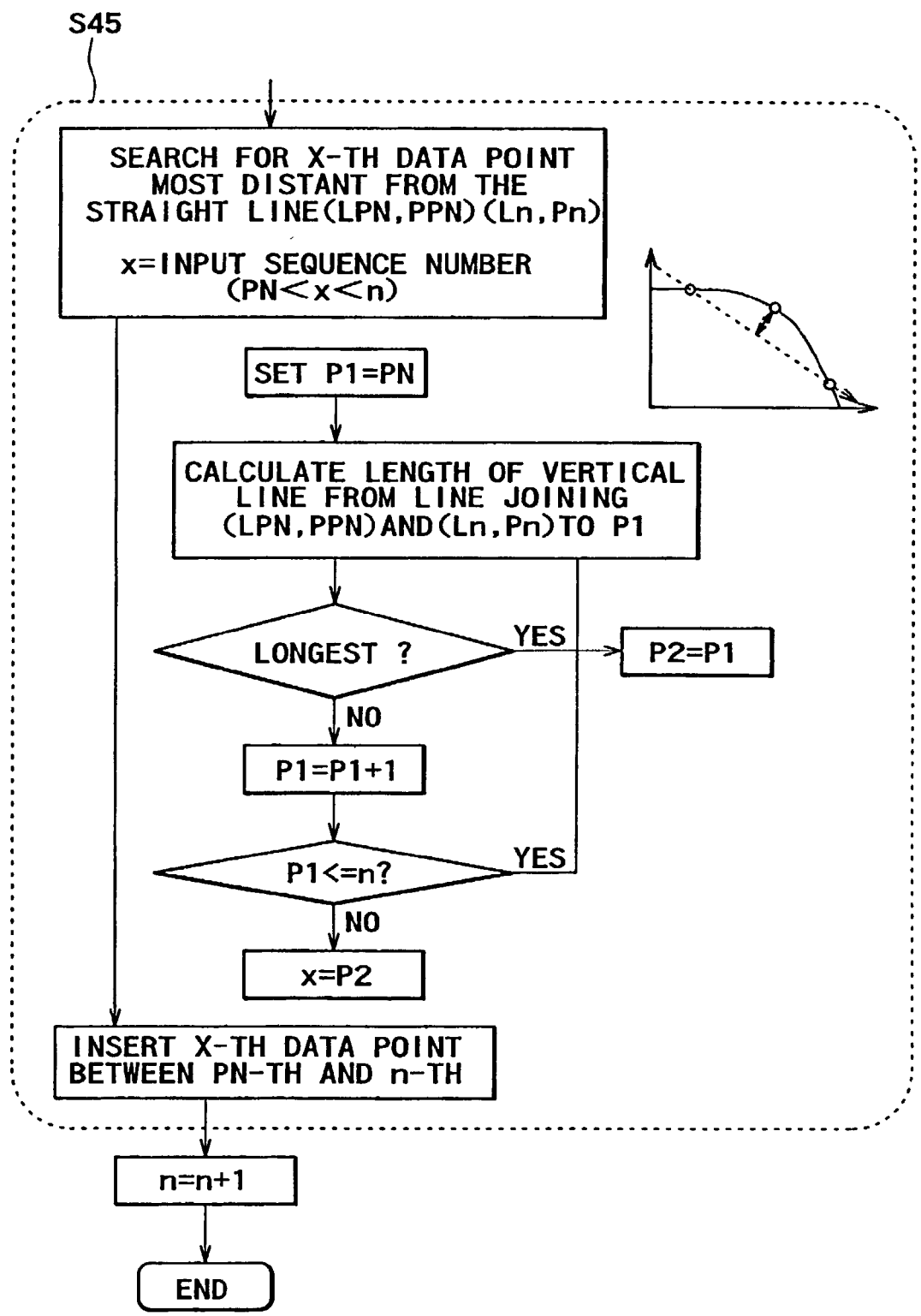

FIG. 7 and FIG. 8 show the flow of processing in extracting a characteristic point with regard to pen pressure. There is a mutual correspondence between FIG. 7 and FIG. 8, FIG. 8 providing a more detailed description of the processing in FIG. 7. Input of the pen pressure data point is received at step 41. As shown in FIG. 8, this data includes a pen pressure value (Pn) at one point and a distance value (Ln). At step 42, for one data point, if there is no previous characteristic point, this point is taken as a characteristic point at step 46. If there had been a previous characteristic point, the difference in pen pressures between that characteristic point and the currently considered point is determined, and if that difference (absolute value) is below a certain threshold value (PK in FIG. 8), this ends without extracting the characteristic point, and a wait is made for the input of the next data point. If the above-noted difference is greater than the threshold value, however, that point is taken as a characteristic point. A line segment is drawn between the previous characteristic point and the currently determined characteristic point, and determination is made of the position of a point, of data points between the two characteristic points that is farthest from this line segment, and this point is inserted between the characteristic points (step 45), these data being stored.

Figure 9A:
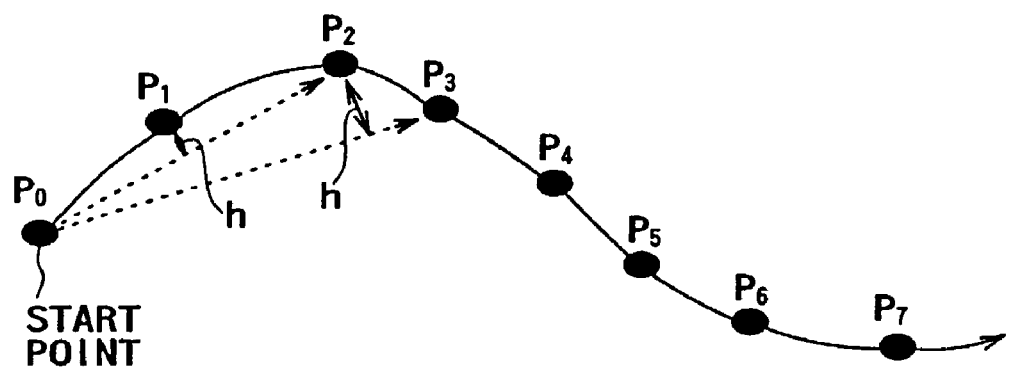
FIG. 9 is a drawing illustrating another method for pen pressure data characteristic point extraction.
Figure 9B:
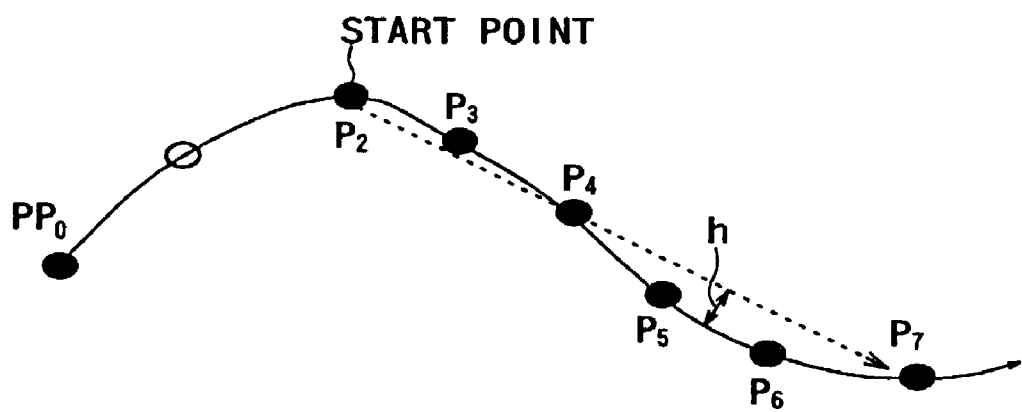

Alternatively, it is possible to perform characteristic point extraction as shown in FIG. 9. The height h (refer to FIG. 9(A)) between a line segment joining the starting point $P_0$ and the coordinate position ($P_2$) of the $3^{rd}$ point and coordinate position $P_1$ of the $2^{nd}$ point is calculated, and a judgment is made as to whether or not the calculation result exceeds a threshold value. If the height h is larger than the threshold value, the coordinates of the $2^{nd}$ point are extracted as a characteristic point. If the height h is less than the threshold value, however, a line segment is established which joins the starting point and the next point, the $3^{rd}$ point. A point in a region having a height greater than the threshold value is detected. If such a point cannot be detected, the connection destination of the line segment is updated. In this example, $P_2$ is detected as a position having a height exceeding the height threshold value. When this is done, the distance data from the starting point is also stored. After the above, the characteristic point detected as shown in FIG. 9(B) is taken as a new starting point, and the above-described processing is repeated.

This processing is for the purpose of finding two characteristic points the curvature of the path between which is greater than a certain value. Stated differently, the above-described processing is directed at finding a position within the coordinate data and pen pressure data matrices at which these values exhibit a great change. Therefore, such small changes as those caused by shaking of the hand and electromagnetic error are not extracted, and extraction of a smoother series of characteristic points becomes possible.

By doing this, based on detected coordinate data and pen pressure data, coordinates of points to be displayed and corresponding pen pressure data are determined. In this embodiment, because the coordinate data of characteristic point includes distance data, that is, because it includes data indicating the distance from a starting point of a path described by a pointing device to a characteristic point, two characteristic points having pen pressure data with distance values in the region of that distance value and pen pressure values at those characteristic points are taken from memory by searching, and calculation is done to determine a value of pen pressure (interpolated value) at the characteristic point at these coordinates. Because this embodiment is directed at reducing the required memory capacity, pen pressure values obtained at the time of input from the pointing device are not linked to coordinate data extracted as characteristic points. However, if there is sufficient memory capacity, if the actually input pen pressure values are stored in association with the coordinate data representing characteristic points, there is no need to calculate the pen pressure values by interpolation.

In this embodiment, there are two methods for establishing the degree of reduction in the amount of data.

The first method is a method preferable for reducing the coordinate data, this being the method of variably setting the radius of the virtual circles described with reference to FIG. 3. Because the smaller is the radius of the virtual circle, the more characteristic point will be detected, although the characteristic point detection accuracy is increased, there is a reduction in the degree of reducing the amount of data. On the other hand, making the radii of the virtual circles large reduces the number of characteristic points detected, thereby increasing the effect of reducing the amount of data. Stated differently, only characteristic points exhibiting strong characteristics are extracted.

Figure 10:
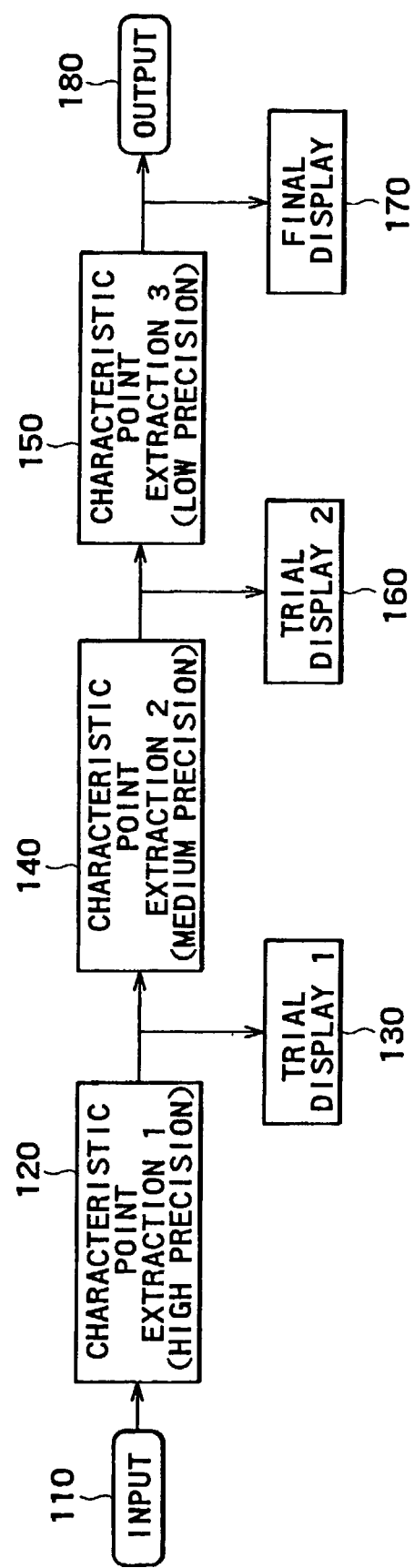
FIG. 10 is a block diagram illustrating repetitive extraction processing.

The second method is that of executing further extraction processing on the already extracted characteristic points. The procedure for this processing is shown in FIG. 10, which shows the example of executing extraction processing three times. From coordinate data and pen pressure data input from a pointing device a characteristic point is extracted at step 120 for the characteristic point extraction 1. For example, as shown in FIG. 11(A), when 25 characteristic points are extracted, a further characteristic point extract 2 from the 25 characteristic points is performed at step 140. By the extraction processing of this step, it is possible to extract 15 characteristic points, as shown in FIG. 11(B).

Additionally, at the characteristic point extraction 3 6 characteristic points are extracted from the 15 characteristic points, as shown in FIG. 11(C). In this manner, it is possible to repeat the characteristic point extraction processing, enabling extraction of characteristic points exhibiting stronger characteristics from the coordinate data and pen pressure data input from the pointing device, and also possible for the user to specify either the degree of reduction in the amount of data or the degree of characteristic point detection accuracy as the number of extraction processing repetitions.

In addition, if the characteristic points extracted at each stage are used to generate vector data for a trial display (steps 130 and 160), it is possible for the user to verify in real time the path input using the pointing device. This trial display is a temporary display made during the processing, and is updated by subsequent processing. The final display (step 170) is the output made at the last processing stage, with no further updates made thereto.

After the above, fitting performed with respect to the points extracted by the above-noted processing is performed so as to calculate the curve. The curves used to make a fit include such curves as a spline curve and a Bezier curve used to pass lines (straight lines or curved lines) through the characteristic points. This fitting process can be performed separately with regard to the coordinate data and the pen pressure data. By doing this, it is possible to obtain more naturally smoothed curves, closer to straight lines and curves intended by the user. In general, if fitting is attempted without performing the above-described extraction processing, problems occurs, such as data overflowing from memory, or the amount of calculations increasing to a level that adversely effects the real-time quality of the process (that is, the fitting result plotting cannot keep up with the input of data).

As noted above and shown in FIG. 1, the coordinate data and pen pressure data are basically mutually independent and data compressed in this manner, as shown in FIG. 1, are preferably stored separately for coordinates and pen pressures. One reason for this is to reproduce the curve faithfully with a small memory capacity. For example, with regard to coordinate data even if only points $P_0$ and $P_4$ are characteristic points, it could be that with regard to pen pressure the intermediate points $P_1$, $P_2$, and $P_3$ are also characteristic points. In this case, the plotted line will be reproduced well with just points $P_0$ and $P_4$. However, the pen pressure or line width cannot be reproduced properly without the information of points $P_0$, $P_1$, $P_2$, $P_3$, and $P_4$. If the coordinate data and pen pressure data were to be stored together, unnecessary coordinate data for the points $P_1$, $P_2$, and $P_3$ will need to be stored, this representing wasteful use of memory space. The second reason that separate storage is preferable is that, when changing data, it is possible to perform data changing as well independently between the coordinate data and the pen pressure data. In the above-noted example, if the $P_1$ coordinate data is to be deleted, unless independent storage is done, the pen pressure data for point P1 will also be lost.

When it is necessary to have matched sets of coordinate data and pen pressure data, it is possible to use the distance between each point. That is, with point $P_0$ as the reference, calculations are made of the distance $L_0$ from $P_0$ to $P_1$, the distance $L_1$ from $P_1$ to $P_2$, and the distance $P_2$ from $P_2$ to $P_3$, taking $P_3$ as the point that is, a distance of $L_0+L_1+L_2$ from $P_0$, and this can be used to search the pen pressure data and coordinate data. By performing this sort of matching, it is possible, for example, to make a screen display or a printed output of a line having a line width that changes with pen pressure.

An example of the configuration of an image-processing apparatus used to perform the above-noted method of data reduction is shown in FIG. 12. Because a general-purpose computer such as a personal computer can be used as the image-processing apparatus, the description herein will be brief.

CPU 1001 executes an image-processing program according to the present invention, so as to reduce the amount of coordinate data and pen pressure data input from the input device 1005, which in this case is a pointing device, the above-described vector data being generated from the compressed data. The CPU 1001 also plots the vector data on the display 1006, thereby reproducing the path input by operation of the input device 1005, and the associated pen pressures.

The ROM 1002 has stored in it a system program for booting the system. The RAM 1003 is used for temporary stored of input and output data relative to the CPU 1001. In this embodiment, because the characteristic point extraction is performed a plurality of times, this memory provides a working screen area for storage of vector data for making a trial display such as shown in FIG. 7, a final screen area for storage of final vector data extracted at the last stage, and a main screen area for storage vector data display on the display 1006. The image-processing program stored in the hard disk (HD) 1007 is loaded into the RAM 1003 and executed by the CPU 1001.

The input/output interface 1004 transfers coordinate data and pen pressure data sent from the input device 1005 to the CPU 1001. The input device 1005 generates coordinate data and pen pressure data for points and paths input by the user, and is a known pointing device, such as the combination of a pen and tablet.

The display 1006 makes a visual display of image data stored in the display data storage area (video RAM) within the RAM 1003. The hard disk 1007 stores an image-processing program, image data and data files used thereby, and an operating system and the like.

The image-processing apparatus additionally has such elements as a keyboard and mouse for inputting characters and values, and a CD-ROM drive or the like.

Referring to FIG. 13 and FIG. 14, the flow of data reduction processing in a system configured as noted above is as follows. In this embodiment, the data reduction processing program is embedded in the image-processing program.

The user uses a mouse or pen (not shown in the drawing) to launch the image-processing program on the hard disk. In response to this launching operation, the image-processing program is loaded into the RAM 1003, after which the program is executed by the CPU 1001. The general processing performed by the image-processing program is shown in FIG. 8.

After performing various initializations in order to perform image editing, the CPU 1001 waits for an instruction from the user (step S10). If an environmental setting instruction is received, environment setting is performed for image editing (steps S20 to S25). In this embodiment, the environment setting processing is the setting of the degree of data reduction. The method of giving this instruction can be one of selecting from the three levels high, medium, and low, selection from a plurality of values, or input of an arbitrary value. The CPU 1001, in response to the instructed degree of reduction, sets the above-described virtual circle radius and/or the number of characteristic point extractions, and writes the set data into an environment setting file.

At step S10 initialization is performed based on this setting data.

When an instruction such as for storage, printing, or editing of a created graphic is given by the user, the performs information processing in accordance with the instruction (step S30 to step S35).

In the image editing mode, input coordinate data and pen pressure data are received from the input device 1005, and plotting is done on the display 1006 of the path of a line indicated by the input coordinate data and pen pressure data (step S40). At this step, data amount reduction is executed. At an end instruction from the user, the processing shown in FIG. 13 ends (step S50 to END).

Details of the data extraction processing are shown in FIG. 14. When coordinate data and pen pressure data are input from the input device 1005, the CPU 1001 stores the input data into the RAM 1003 (step S100). Coordinate data and pen pressure data for a prescribed number of points are captured into the RAM 1003. During this processing, characteristic point extraction processing is not performed. When coordinate data and pen pressure data beyond the prescribed number of points is input, each time these data are input the processing of step S110 through step S150 is repeated a number of times established by the previously stored environment setting. Specifically, characteristic point extraction processing (refer to FIG. 3) is performed with respect to coordinate data stored in the ring-configured memory area of the RAM 1003. The coordinate data of the extracted characteristic points is stored in the working area of the RAM 1003 (step S110, corresponding to step 20 in FIG. 1).

Next, the coordinate data of characteristic points from the pen pressure data input thus far is performed in the same manner, these characteristic points being stored in the working area of the RAM 1003 (step S120, corresponding to step 40 of FIG. 1).

Using the coordinate data and pen pressure data of the characteristic points extracted by the first processing vector data is generated, the vector data obtained from the first data amount reduction processing being stored in the trial screen area of the RAM 1003. This vector data is also stored in the main screen storage area (refer to FIG. 1) for display.

Based on the vector data stored in the main screen area, image data as in the past is generated (color data for each pixel), this being displayed on the display 1006 (step S140).

After the above, further extractions of characteristic points from the coordinate data and pen pressure data are performed to generate vector data, this being repeated a number of times established by the environment setting, thereby creating the display of a line path (loop processing of step S110 to step S150).

Thereafter, each time new coordinate data and pen pressure data are input from the input device 1005, data amount reduction processing is performed (loop processing of step S100 to step S160). At the point at which the data input processing from the input device 1005 is completed, in other words when another instruction is made to the CPU 1001, the processing shown in FIG. 14 is ended (step S160 to END).

Vector data generated in this manner can be subjected to such image processing as magnification and reduction.

As described above, in this embodiment of the present invention the amount of data is compressed by extracting coordinate data indicating characteristics of a path from the continuously input stream of coordinate data. By extracting pen pressure data indicating the characteristic changes in the pen pressure data from the continuously input stream of pen pressure data, it is possible to compress the amount of data in the same manner. Therefore, vector data generated from the extracted coordinate data and pen pressure data makes use of the path and pen pressure characteristics input by the user via the input device 1005, and at the same time enables reduction (lightening) of the amount of coordinate and pen pressure data used for internal processing. Because the amount of vector data subjected to image processing is smaller, this embodiment has the added advantage of reducing the time required for image processing.

Another embodiment of the present invention, described below, can be envisioned. Specifically, because of shaking of the hand of a user or electromagnetic error when the input device 1005 is used, coordinate data and line width data exhibit jitter. While the first embodiment reduces such jitter, it is alternatively possible to perform a separate processing before performing data amount reduction. While such jitter is not that much of a problem in the case in which the resolution of the pointing device or display is low, this becomes a serious problem if it is necessary to obtain highly precise, high-resolution images. A method of jitter processing according to the present invention is shown in FIG. 15.

Assume that the input device 1005 has been used to generate the coordinate data $P_0$ to $P_5$.

Weighted arithmetic averaging is performed using these 5 coordinate data. Because simple arithmetic averaging will result in a loss of data characteristics, it should be noted that weighted averaging is performed. The weighting coefficients used are established in accordance with distance from a point of interest. For example, in the case of performing jitter processing with respect to the point $P_0$ using the 5 points, the new compensated point $P_0$ is calculated as follows.

$$\text{New} P_o = \sum_{i=1}^{5} Ai \times Pi$$

Weighting coefficients are calculated in accordance with the relationship weight Ai=1− (distance from the starting point to the i-th point)/(sum of the distances of the 5 points), so that points closer to the point being compensated are given greater weight. While this example is one of using 5 previous points, it will be understood that it is possible if necessary to change the number of previous points, as the variable K, that are used, and it is possible to treat this variable K as the distance of the previous points being referenced.

The flow of this jitter compensation processing is shown in FIG. 16 and FIG. 17, the latter FIG. 17 being the same as FIG. 16, except that the processing is shown in greater detail.

At step 200 input of new coordinate data is accepted. In the case in which it is not possible to obtain previously input coordinate data, it is assumed that such data does not exist, and process control proceeds to step 205 and weighted arithmetic averaging is not performed (step 201). If it is possible to obtain this data, however, a check is made as to whether or not the past input data goes back to the reference distance (expressed by the variable K) (step 202). If it does not go back that far, processing proceeds to step 203, at which the weighting coefficients are determined, but if it does go back that far processing proceeds to step 205, since the weighting coefficients should have been determined. At step 203 and step 204, weighting coefficients are determined in accordance with the distance between the newest coordinates and past coordinates, the product of the past coordinates and the weighting coefficient being added to the newest coordinates. This is repeated as a check is made as to whether or not past coordinates up to the prescribed distance have been processed (step 202), and when the back-tracking has been completed, processing proceeds to step 205, at which the newest coordinates are divided by the sum of the previously determined weighting coefficients and output as the new coordinate data. FIG. 17 shows this flow in further detail, expressed using the equations used.

When this jitter compensation is performed sequentially from the input data $P_0$, the position indicated by the compensated data, is as shown by the points passing through the non-compensated data which jitters as shown by the circles in FIG. 15. It is therefore possible achieve a great reduction in jitter caused by hand shake and electromagnetic reading error.

The jitter compensation step is performed between the input step 10 and the data amount reductions steps 20 and 40 of FIG. 1.

While embodiments of the present invention are described above for the example of application to an image-processing apparatus which performs image processing, it will be understood that the present invention can be applied as well to a variety of information processing apparatuses that display a path input from a tablet. The present invention, therefore, can also be applied to an image-processing apparatus, an information processing apparatus, and a computer which perform the above-noted processing.

It will be further understood that the recording medium used in the present invention encompasses all such media as a CD-ROM, a magneto-optical disk, a floppy disk, a hard disk, and an IC memory or the like, which are capable of storing and recording information. The program of the present invention is provided stored into such a recording medium.

Additionally, although in the foregoing examples the generated vector data is displayed on a display, it will be understood that the vector data can alternatively be output to a printer or to a computer.

As described in detail above, according to the present invention, it is possible to compress the coordinate data and the pen pressure data while leaving intact the characteristics of the path input by a user and the changes in pen pressure, thereby enabling real-time vector data processing and display processing.

What is claimed is:

1. A method for obtaining vector data for a hand-drawn curve, comprising:
    a step of receiving and storing in a temporary memory coordinate data and pen pressure data representing points of a hand-drawn path obtained from a pointing device;
    a first extraction step of extracting from the coordinate data stored in the temporary memory coordinate characteristic points indicating characteristics of the path;
    a coordinate data storage step of storing the coordinate characteristic points into a first storage means;
    a second extraction step of extracting pen pressure characteristic points characterizing changes in pen pressure from the pen pressure data stored in the temporary memory;
    a pen pressure data storage step of storing the pen pressure characteristic points into a second storage means; and
    a plotting processing step of using the coordinate characteristic points stored in the first storage means and the pen pressure characteristic points stored in the second storage means to calculate a curve along which the thickness or density thereof changes in response to the pen pressure,
    wherein the first and second extraction steps are carried out independently of each other.

2. The method according to claim 1, further comprising a step, performed before the first and second extraction steps, of performing jitter reduction processing with respect to the coordinate data and pen pressure data stored in the temporary memory.

3. The method according to claim 2, wherein the jitter reduction processing is performed for a given point of the path represented by the coordinate data and the pen pressure data by obtaining a weighted average of the coordinates of a plurality of points including the given point, weighted based on distance between each point of the plurality of points and the given point.

4. The method according to claim 1, wherein the second extraction step includes determining that a current pen pressure point of the path represented by the coordinate data and the pen pressure data is a pen pressure characteristic point when a difference between the current pen pressure point and a previous pen pressure characteristic point is greater than a threshold.

5. The method according to claim 4, wherein the first extraction step includes determining that a current coordinate point of the path represented by the coordinate data and the pen pressure data is a coordinate characteristic point when a distance between the current coordinate point and a previous coordinate characteristic point exceeds a criterion.

6. The method according to claim 5, wherein the coordinate characteristic points and the pen pressure characteristic points are related to one another by way of distances among extracted characteristic points.

7. The method according to claim 1, further comprising a third extraction step whereby with respect to one of the coordinate characteristic points obtained by the first extraction step, a further characteristic point extraction operation is performed, the third extraction step being performed before the coordinate data storage step.

8. The method according to claim 1, further comprising additional extraction step whereby with respect to one of the pen pressure characteristic points obtained by the second extraction step, a further characteristic point extraction operation is performed, the additional extraction step being performed before the pen pressure data storage step.

9. The method according to claim 1, wherein the plotting processing step further includes a step of performing interpolation with respect to the coordinate characteristic points and the pen pressure characteristic points, using a spline curve to obtain a curve for plotting or screen display.

10. The method according to claim 1, wherein the plotting processing step further includes a step of performing interpolation with respect to the coordinate characteristic points and the pen pressure characteristic points, using a spline curve to obtain at least one of a line thickness or a density of a curve for plotting or screen display.

11. The method according to claim 1, further comprising the step of, when a capacity of the temporary memory is full, replacing oldest data stored in the temporary memory with newest data, the oldest data and the newest data each including data selected from the group consisting of the pen pressure data and the coordinate data.

12. A computer-readable recording medium having a program encoded thereon, the program being executable by an image processing apparatus, information processing apparatus or a computer to perform a method, said method comprising:

a step of receiving and storing in a temporary memory coordinate data and pen pressure data representing points of a hand-drawn path obtained from a pointing device;

a first extraction step of extracting from the coordinate data stored in the temporary memory coordinate characteristic points indicating characteristics of the path;

a coordinate data storage step of storing the coordinate characteristic points into a first storage means;

a second extraction step of extracting pen pressure characteristic points characterizing changes in pen pressure from the pen pressure data stored in the temporary memory;

a pen pressure data storage step of storing the pen pressure characteristic points into a second storage means; and a plotting processing step of using the coordinate characteristic points stored in the first storage means and the pen pressure characteristic points stored in the second storage means to calculate a curve along which the thickness or density thereof changes in response to the pen pressure, wherein the first and second extraction steps are carried out independently of each other.

13. An information processing apparatus, comprising:

a temporary memory operable to store coordinate data and pen pressure data representing points of a hand-drawn path obtained from a pointing device;

means for extracting from the coordinate data stored in the temporary memory coordinate characteristic points indicating characteristics of the path;

first storage means operable to store the coordinate characteristic points;

means f or extracting pen pressure characteristic points characterizing changes in pen pressure from the pen pressure data stored in the temporary memory;

second storage means operable to store the pen pressure characteristic points; and means for calculating a curve along which the thickness or density thereof changes in response to the pen pressure using the coordinate characteristic points stored in the first storage means and the pen pressure characteristic points stored in the second storage means, wherein extraction of the coordinate characteristic points by the means for extracting coordinate characteristic points is independent of extraction of the pen pressure characteristic points by the means for extracting pen pressure characteristic points.

* * * * *

UNITED STATES PATENT AND TRADEMARK OFFICE
CERTIFICATE OF CORRECTION

PATENT NO.         : 7,116,844 B2  
APPLICATION NO. : 10/215642  
DATED                 : October 3, 2006  
INVENTOR(S)       : Yosuke Kawakami and Hiroshi Ono It is certified that error appears in the above-identified patent and that said Letters Patent is hereby corrected as shown below:

Column 13, line 36 after "comprising" insert --an--.
Column 14, line 40 "f or" should read --for--.

Signed and Sealed this

Nineteenth Day of June, 2007

JON W. DUDAS  
*Director of the United States Patent and Trademark Office*